US011382387B2

(12) United States Patent
Tateishi et al.

(10) Patent No.: US 11,382,387 B2
(45) Date of Patent: Jul. 12, 2022

(54) SHOE SOLE MEMBER AND SHOE (71) Applicant: ASICS CORPORATION, Kobe (JP)

(72) Inventors: Junichiro Tateishi, Kobe (JP); Takashi Yamade, Kobe (JP)

(73) Assignee: ASICS CORPORATION

( * ) Notice: Subject to any disclaimer, the term of this patent is extended or adjusted under 35 U.S.C. 154(b) by 174 days.

(21) Appl. No.: 15/515,076

(22) PCT Filed: Sep. 30, 2014

(86) PCT No.: PCT/JP2014/076168
§ 371 (c)(1),
(2) Date: Mar. 28, 2017

(87) PCT Pub. No.: WO2016/051532
PCT Pub. Date: Apr. 7, 2016

(65) Prior Publication Data
US 2017/0215522 A1 Aug. 3, 2017

(51) Int. Cl.
*A43B 13/18* (2006.01)
*A43B 13/04* (2006.01)
*C08J 9/00* (2006.01)
*C08J 9/04* (2006.01)

(52) U.S. Cl.
CPC ............ *A43B 13/187* (2013.01); *A43B 13/04* (2013.01); *C08J 9/0061* (2013.01); *C08J 9/04* (2013.01); *C08J 2201/026* (2013.01); *C08J 2207/00* (2013.01); *C08J 2300/22* (2013.01); *C08J 2300/26* (2013.01); *C08J 2400/22* (2013.01); *C08J 2400/26* (2013.01)

(58) Field of Classification Search
CPC ...... A43B 13/04; A43B 13/187; C08J 9/0061; C08J 9/04; C08J 2201/026; C08J 2207/00; C08J 2300/22; C08J 2300/26; C08J 2400/22; C08J 2400/26
See application file for complete search history.

(56) References Cited

U.S. PATENT DOCUMENTS

| 5,550,190 | A  | 8/1996  | Hasegawa et al. |
|-----------|----|---------|-----------------|
| 2007/0251572 | A1 | 11/2007 | Hoya et al. |
| 2013/0011596 | A1 | 1/2013  | Hoya et al. |
| 2013/0011649 | A1 | 1/2013  | Hoya et al. |
| 2013/0017351 | A1 | 1/2013  | Hoya et al. |
| 2013/0017379 | A1 | 1/2013  | Hoya et al. |
| 2016/0060407 | A1 | 3/2016  | Hoya et al. |
| 2016/0060443 | A1 | 3/2016  | Hoya et al. |
| 2016/0122492 | A1 | 5/2016  | Hoya et al. |

FOREIGN PATENT DOCUMENTS

| CN | 103571033 | * | 2/2014 | |
| CN | 103571034 | * | 2/2014 | |
| EP | 2361948 A1 | * | 8/2011 | ............ A43B 13/04 |
| EP | 2 805 637 A1 | | 11/2014 | |
| JP | H05-125263 A | | 5/1993 | |
| JP | H11-206406 A | | 8/1999 | |
| JP | 2004-43606 A | | 2/2004 | |
| JP | 2007-238783 A | | 9/2007 | |
| WO | 2006/057361 A | | 6/2006 | |
| WO | 2013/108378 A1 | | 7/2013 | |

OTHER PUBLICATIONS

CN 103571034, English abstract, Feb. 2014.*
CN 103571034, English machine trabnslation, Feb. 2014.*
CN 103571033, English abstract, Feb. 2014.*
CN 103571033, English machine trabnslation, Feb. 2014.*
Extended European Search Report for European Patent Application No. 14903012.4 dated Apr. 5, 2018.
International Preliminary Report on Patentability for International Patent Application No. PCT/JP2014/076168 dated Apr. 13, 2017.
English translation of the International Search Report for International Application No. PCT/JP2014/076168 dated Dec. 22, 2014.

* cited by examiner

*Primary Examiner* — Irina S Zemel
(74) *Attorney, Agent, or Firm* — Katten Muchin Rosenman LLP (57) ABSTRACT

Provided is a shoe sole member partially or entirely formed by a crosslinked foam, wherein the crosslinked foam shows specific results of pulsed NMR measurement.

9 Claims, 3 Drawing Sheets

SHOE SOLE MEMBER AND SHOE

FIELD

The present invention relates to a shoe sole member and a shoe, more specifically, to a shoe sole member used, for example, as an inner sole, a sock liner, a midsole, or an outer sole, and a shoe including such a shoe sole member.

BACKGROUND

Sports shoes used for various competitions are composed of a large number of members. For example, a shoe sole is composed of shoe sole members such as an inner sole, a sock liner, a midsole, and an outer sole. Materials used for such shoe sole members are required to have properties such as lightweight, mechanical strength that reduces deformation due to a long-term use and imparts durability under severe use conditions, and shock absorbing properties. Conventionally, shoe sole members of this type have been formed using foam products containing ethylene-vinyl acetate copolymer (EVA) or polyethylene as a main component.

For enhancing the rebound resilience in order to allow shoes to be comfortable, conventional shoe sole members formed using crosslinked foams of a mixture of ethylene-vinyl acetate copolymer (EVA) and/or polyethylene with rubber or ethylene-butene copolymer (EBM), particularly, formed using crosslinked foams of ethylene-vinyl acetate copolymer have been widely used (see Patent Literature 1 below).

For allowing shoes to be comfortable, it is desirable that the shoe sole members have excellent rebound resilience while having appropriate stiffness or rigidity (hardness) and lightweight properties. Further, the shoe sole members may be subjected to high temperature in shoemaking process, and therefore it is desirable that the shoe sole members do not undergo excessive thermal deformation when they are subjected to high temperature and have good heat resistance. In general, in the case where the rebound resilience is improved by using EBM as disclosed in Patent Literature 1 in order to satisfy the aforementioned requirements on the shoe sole members, the heat resistance of crosslinked foams tends to decrease. However, a technique that allows both the rebound resilience and the heat resistance of crosslinked foams to be excellent has not been found so far, and thus it is difficult to satisfy the aforementioned requirements.

CITATION LIST

Patent Literature

Patent Literature 1: JP H11-206406 A

SUMMARY

Technical Problem

It is therefore an object of the present invention to provide a crosslinked foam that can have low specific gravity, excellent heat resistance, and mechanical properties suitable for shoe sole members, and to provide a shoe sole member suitable for forming a comfortable shoe, so as to provide a comfortable shoe.

Solution to Problem

As a result of diligent studies, the inventor has found that the above problems can be solved by classifying the phases of a polymer composition forming a crosslinked foam into three phases of a phase in which a short spin-spin relaxation time is observed in pulsed NMR measurement such as a crystalline phase, a phase in which a long spin-spin relaxation time is observed such as an amorphous phase, and an intermediate phase between these phase, and by forming these three phases in a well-balanced manner in the crosslinked foam. That is, the inventor has accomplished the present invention by finding that the crosslinked foam can have low specific gravity, excellent heat resistance, and mechanical properties suitable for shoe sole members by forming the three phases in a well-balanced manner in the crosslinked foam.

That is, the present invention is a shoe sole member partially or entirely formed by a crosslinked foam, wherein the crosslinked foam is formed by crosslinking and foaming a polymer composition and satisfies formulas (1) and (2) below that are determined by measuring a spin-spin relaxation time at 23° C. by pulsed NMR and formula (3) below that is determined in dynamic viscoelasticity measurement by measuring a complex elastic modulus under conditions of a frequency of 1 Hz, a distortion of 0.025%, a rate of temperature increase of 2° C./min:

$$F_S/T_{2S} \geq 10 \qquad (1);$$

$$0.10 \leq F_M \cdot T_{2M} + F_L \cdot T_{2L} \leq 0.30 \qquad (2),$$

where "$F_S$" in formula (1) above represents a content ratio of S phase having a spin-spin relaxation time of less than 0.02 ms in the crosslinked foam, and "$T_{2S}$" represents the spin-spin relaxation time of S phase; "$F_M$" in formula (2) above represents a content ratio of M phase having a spin-spin relaxation time of 0.02 ms or more and less than 0.1 ms in the crosslinked foam, and "$T_{2M}$" represents the spin-spin relaxation time of M phase; "$F_L$" in formula (2) above represents a content ratio of L phase having a spin-spin relaxation time of 0.1 ms or more in the crosslinked foam, and "$T_{2L}$" represents the spin-spin relaxation time of L phase; unit of $F_S/T_{2S}$ is "1/ms"; and unit of $F_M \cdot T_{2M} + F_L \cdot T_{2L}$ is "ms"; and $$E^*(80° C.)/E^*(23° C.) \geq 0.1 \qquad (3),$$

where "$E^*(80° C.)$" in formula (3) above represents a complex elastic modulus at 80° C., and "$E^*(23° C.)$" in formula (3) above represents a complex elastic modulus at 23° C.

In the present invention, it is more preferable that the polymer composition contain a thermoplastic styrene elastomer, and a content ratio of the thermoplastic styrene elastomer in the polymer be 20 to 70 mass %.

In the present invention, it is more preferable that the polymer composition contain an ethylene-α-olefin block copolymer (a block copolymer of ethylene and α-olefin), and a content ratio of the ethylene-α-olefin block copolymer in the polymer be 20 to 70 mass %.

In the present invention, it is more preferable that the polymer composition contain a thermoplastic polyester elastomer, and a content ratio of the thermoplastic polyester elastomer in the polymer be 20 to 70 mass %.

In the present invention, it is more preferable that the polymer composition contain a thermoplastic polyamide elastomer, and a content ratio of the thermoplastic polyamide elastomer in the polymer be 20 to 70 mass %.

Further, the present invention is a shoe including the aforementioned shoe sole member.

Advantageous Effects of Invention

The present invention can provide a shoe sole member suitable for forming a comfortable shoe, and a comfortable shoe.

DESCRIPTION OF EMBODIMENTS

Figure 1:
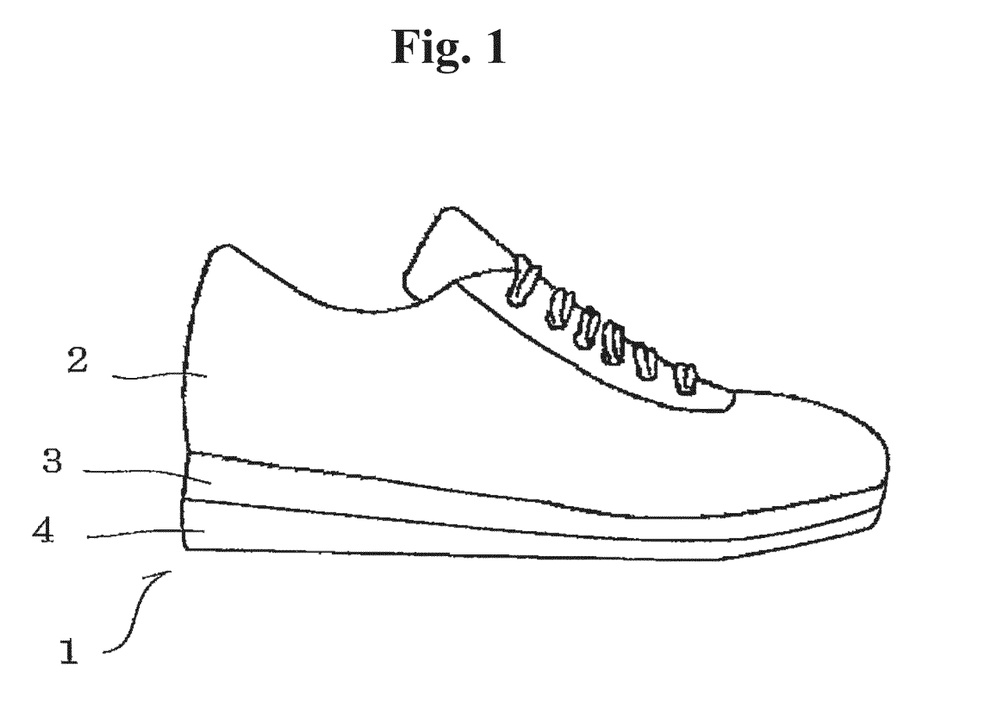
FIG. 1 is a schematic side view showing an embodiment of a shoe including a shoe sole member.

A shoe sole member of the present invention will be described below by showing the embodiments thereof. FIG. 1 shows a shoe formed using shoe sole members of this embodiment. A shoe 1 has an upper material 2 and shoe sole members 3 and 4. The shoe 1 has a midsole 3 and an outer sole 4 as the shoe sole members.

The shoe sole members of this embodiment are partially or entirely formed using a crosslinked foam. It is important that a polymer composition forming the crosslinked foam of this embodiment has a specific molecular mobility in the crosslinked foam. That is, for allowing the crosslinked foam to exert the aforementioned properties, it is important to form a crystalline region in which the molecular motion is strongly restricted by a crystal structure, a quasicrystal structure, or the like, and an amorphous region in which the molecular chains are comparatively freely movable at an appropriate ratio in the bubble membrane of the crosslinked foam, and to form crosslinking or pseudo crosslinking at an appropriate ratio in the amorphous region.

More specifically, it is necessary, when the crosslinked foam is measured by pulsed NMR, to satisfy the conditions of formula (1) and formula (2) below. The spin-spin relaxation time can be determined, for example, by performing a measurement using the solid-echo method at a temperature of 23° C. and pulsed NMR, model name "minispec mq20", manufactured by Bruker Optics K.K.

$$F_S/T_{2S} \geq 10 \qquad (1)$$

$$0.10 \leq F_M \cdot T_{2M} + F_L \cdot T_{2L} \leq 0.30 \qquad (2)$$

Here, formula (1) and formula (2) above are determined by classifying the phases of the polymer composition into S phase having a spin-spin relaxation time of less than 0.02 ms, M phase having a spin-spin relaxation time of 0.02 ms or more and less than 0.1 ms, and L phase having a spin-spin relaxation time of 0.1 ms or more, in pulsed NMR measurement at 23° C. Further, unit of $F_S/T_{2S}$ is "1/ms", and unit of $F_M \cdot T_{2M} + F_L \cdot T_{2L}$ is "ms".

In the pulsed NMR, when the elapsed time after the pulsed magnetic field is applied is referred to as t (ms), the magnetization at t=0 is referred to as MO, and the magnetization at the time t is referred to as M (t), the spin-spin relaxation time ($T_2$) is determined based on the following formula. In the following formula, "W" represents the weibull modulus.

$$M(t) = M_0 \exp\left(-\frac{t}{T_2}\right)^w \qquad \text{Formula 1}$$

Supposing that, when the measurement target is decomposed into n components, the magnetization of the i-th (i<n) component at t=0 is $M_{0i}$, and the weibull modulus of the i component is $W_i$, the spin-spin relaxation time of the i component ($T_{2i}$), and the ratio $F_i$ of the i component are determined based on the following formula. For example, $W_S=2$, $W_M=1$, and $W_L=1$ can be used as the weibull modulus $W_i$. Such a method for determining the relaxation time is disclosed, for example, in S. Yamasaki et al Polymer 48 4793 (2007).

$$M(t) = \sum_{i}^{n} M_{0i} \exp\left(-\frac{t}{T_{2i}}\right)^{w_i} \qquad \text{Formula 2}$$

$$F_i = \frac{M_{0i}}{\sum_{i}^{n} M_{0i}} \qquad \text{Formula 3}$$

Specifically, the term $[F_S/T_{2S}]$ is determined by determining the ratio ($F_S$) of S phase having a spin-spin relaxation time of more than 0 ms and less than 0.02 ms with respect to the entirety as a result of pulsed NMR measurement and the relaxation time ($T_{2S}$ [ms]) of S phase and dividing the ratio ($F_S$) of S phase by the spin-spin relaxation time ($T_{2S}$).

Further, the term $[F_M \cdot T_{2M}]$ is determined by determining the ratio ($F_M$) of M phase having a spin-spin relaxation time of 0.02 ms or more and less than 0.1 ms with respect to the entirety and the relaxation time ($T_{2M}$) of M phase, and multiplying the ratio ($F_M$) of M phase by the spin-spin relaxation time ($T_{2M}$).

Likewise, the term $[F_M \cdot T_{2M}]$ is determined by determining the ratio ($F_L$) of L phase having a spin-spin relaxation time of 0.1 ms or more with respect to the entirety and the relaxation time ($T_{2L}$) of L phase and multiplying the ratio ($F_L$) of L phase by the spin-spin relaxation time ($T_{2L}$).

The terms $[F_L \cdot T_{2L}]$ and $[F_M \cdot T_{2M}]$ are preferably values satisfying the following conditions.

$$0.08 \leq [F_L \cdot T_{2L}] \leq 0.30$$

$$0.60 \leq [F_M \cdot T_{2M}] \leq 0.90$$

In the case of a general polymer, the spin-spin relaxation time ($T_{2S}$, $T_{2M}$, and $T_{2L}$) and the content ratio ($F_S$, $F_M$, and $F_L$) of each phase do not significantly vary before and after crosslinking. Therefore, a crosslinked foam satisfying the relations shown in the aforementioned inequalities can be obtained with high probability by performing the pulsed NMR measurement to prepare an uncrosslinked polymer that satisfies the relations shown in the aforementioned inequalities and employing the polymer as a polymer of the polymer composition for forming the crosslinked foam.

Further, in the case of a general polymer, the spin-spin relaxation time and the content ratio of each phase are not significantly different depending on whether or not they are foamed. Therefore, in the case where it is necessary to predict whether or not a crosslinked foam satisfying the relations shown in the aforementioned inequalities is obtained more reliably, the prediction may be made by producing a non-foamed crosslinked sample using a polymer and subjecting the sample to the pulsed NMR measurement.

For the content ratios of S phase, M phase, and L phase, for example, in the case of a crystalline polymer, the crystalline phase is mainly observed as S phase in the pulsed NMR measurement, and the amorphous phase is mainly observed as M phase or L phase. Further, in the case of a block copolymer having a hard segment and a soft segment, the hard segment portion is mainly observed as S phase in the pulsed NMR measurement, and the soft segment portion is mainly observed as M phase or L phase.

Accordingly, it is possible to know the tendencies of the relaxation time and the content ratio depending on the degree of crystallinity, for example, by subjecting several types of polyethylenes having different densities (different degrees of crystallinity) to the pulsed NMR measurement and collecting data on the spin-spin relaxation time and the content ratio of each phase. That is, in the case of using a polyethylene as the polymer of the crosslinked foam, it is possible to predict the spin-spin relaxation time of the crosslinked foam and the content ratio of each phase from the results of the pulsed NMR measurement for another polyethylene without necessarily performing the pulsed NMR measurement in advance for the used polyethylene.

Likewise, also for block copolymers, it is also possible to know how the spin-spin relaxation time and the ratio vary depending on the ratio of the hard segment and the soft segment by subjecting several types of block copolymers having different ratios of the hard segment and the soft segment to the pulsed NMR measurement.

Further, in the case where the polymer composition contains a plurality of polymers, it is possible to predict the spin-spin relaxation time of the crosslinked foam and the ratio by measuring the spin-spin relaxation time ($T_{2S}$, $T_{2M}$, and $T_{2L}$) of each polymer and the content ratio ($F_S$, $F_M$, and $F_L$) of each layer and calculating the weighted average of these corresponding to the compounding ratios in the polymer composition.

That is, the value of $[F_S/T_{2S}]$ is higher when a larger amount of a crystalline polymer having a high degree of crystallinity or a block copolymer having a high content of the hard segment is contained in the polymer composition. Conversely the value of $[F_L \cdot T_{2L} + F_M \cdot T_{2M}]$ is higher when a larger amount of a crystalline polymer having a low degree of crystallinity or a block copolymer having a high content of the soft segment is contained in the polymer composition.

In this embodiment, when the value of $[F_M \cdot T_{2M} + F_L \cdot T_{2L}]$ is 0.10 or more, a high rebound resilience can be achieved. Further, when the value of $[F_M \cdot T_{2M} + F_L \cdot T_{2L}]$ is 0.30 or less, and the value of $[F_S/T_{2S}]$ is 10 or more, a high stiffness can be achieved.

In this embodiment, in order to obtain a comfortable shoe, the rebound resilience of the crosslinked foam is preferably 51% or more. The rebound resilience is a value measured based on ASTM D2632.

In this embodiment, the specific gravity of the crosslinked foam is preferably 0.05 to 0.30. The specific gravity of the crosslinked foam means a value measured by the A method "Underwater displacement" of JIS K7112 under a temperature condition of 23° C.

In this embodiment, in order to allow the shoe sole members to have excellent softness, the Asker C hardness of the crosslinked foam is preferably 70 or less, more preferably 60 or less, particularly preferably 55 or less. However, if the shoe sole members are formed by a crosslinked foam having excessively low hardness, the foot comfort of shoes including the shoe sole members may possibly be reduced. Accordingly, the Asker C hardness of the crosslinked foam is preferably 10 or more. The Asker C hardness of the crosslinked foam means an instantaneous value obtained by conducting a spring hardness test by the type C of JIS K7312 at 23° C. More specifically, the Asker C hardness can be determined, for example, by removing a surface portion from a crosslinked foam formed to have a specific shape by in-mold foam molding or the like to produce a measurement sample in the form of a plate with a thickness of 10 mm or more, and measuring the measurement sample based on JIS K7312.

In this embodiment, it is important that the crosslinked foam be a crosslinked foam satisfying the conditions of formula (3) below.

$$E^*(80°\text{ C.})/E^*(23°\text{ C.}) \geq 0.1 \quad (3)$$

Further, the crosslinked foam is preferably a crosslinked foam satisfying the conditions of formula (4) below.

$$E^*(-40°\text{ C.})/E^*(23°\text{ C.}) \leq 15 \quad (4)$$

Here, formula (3) and formula (4) above are determined by measuring the complex elastic modulus of the crosslinked foam by dynamic viscoelasticity measurement (frequency: 1 Hz, distortion: 0.025%, and rate of temperature increase: 2° C./min). The term "$E^*(80°\text{ C.})$" in formula (3) above represents a complex elastic modulus at 80° C. Further, the term "$E^*(23°\text{ C.})$" in formula (3) and formula (4) above represents a complex elastic modulus at 23° C. Further, the term "$E^*(-40°\text{ C.})$" in formula (4) above represents a complex elastic modulus at −40° C. The complex elastic modulus means a value measured according to JIS K7244-4: 1999 "Plastic-Test method for dynamic mechanical properties-Part 4: Tensile vibration-Non-resonance method".

$E^*(80°\text{ C.})/E^*(23°\text{ C.})$ is a ratio of the complex elastic modulus at high temperature (80° C.) with respect to the complex elastic modulus at standard temperature (23° C.). A large value of $E^*(80°\text{ C.})/E^*(23°\text{ C.})$ indicates that softening of the crosslinked foam is difficult at high temperature. Accordingly, when $E^*(80°\text{ C.})/E(23°\text{ C.})$ is 0.1 or more, softening of the crosslinked foam is difficult at high temperature. As a result, deformation of the crosslinked foam is difficult at high temperature, that is, the crosslinked foam has excellent heat resistance. $E^*(80°\text{ C.})/E^*(23^*C)$ is preferably 0.13 or more.

$E^*(-40°\text{ C.})/E^*(23°\text{ C.})$ is a ratio of the complex elastic modulus at low temperature (−40° C.) with respect to the complex elastic modulus at standard temperature (23° C.). A small value of $E^*(-40°\text{ C.})/E^*(23°\text{ C.})$ indicates that curing of the crosslinked foam is difficult at low temperature. Accordingly, when $E^*(-40°\text{ C.})/E^*(23°\text{ C.})$ is 15 or less, curing of the crosslinked foam is difficult at low temperature. $E^*(-40°\text{ C.})/E^*(23°\text{ C.})$ is preferably 13 or less, more preferably 10 or less.

In this embodiment, the polymer serving as the main component of the polymer composition is not specifically limited, and can be the same as polymers used for forming conventional shoe sole members.

As the polymer, one or two or more selected from olefin polymers such as polyethylene (for example, linear low density polyethylene (LLDPE) and high density polyethylene (HDPE)), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-butene copolymer (EBM), 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), propylene-vinyl acetate copolymer, and ethylene-α-olefin (having 3 to 10 carbon atoms) copolymer (copolymer of ethylene and α-olefin (having 3 to 10 carbon atoms)) can be employed.

Other than the olefin polymers, one or two or more selected from polyurethane polymers such as polyester polyurethane and polyether polyurethane; and styrene polymers such as styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), polystyrene, acrylonitrile styrene resin (AS resin), acrylonitrile butadiene styrene resin (ABS resin), and thermoplastic styrene elastomer (TPS) can be employed as the polymer. Other than above, thermoplastic polyester elastomer (TPEE), thermoplastic polyamide elastomer (TPAE), and the like also can be employed as the polymer.

Further, examples of polymers that can be employed as the polymer in this embodiment include fluorine polymers such as fluororesin and fluororubber; polyamide polymers such as polyamide elastomers and polyamide resins, e.g., polyamide 6, polyamide 11, polyamide 12, polyamide 6,6, and polyamide 610; polyester resins such as polyethylene terephthalate and polybutylene terephthalate; polyvinyl chloride resin; acrylic resins such as polymethylmethacrylate; silicone elastomers; butadiene rubber (BR); isoprene rubber (IR); chloroprene (CR); natural rubber (NR); styrene butadiene rubber (SBR); acrylonitrile butadiene rubber (NBR); and butyl rubber (IIR).

Further, particularly for enhancing the rebound resilience of the crosslinked foam, the polymer composition preferably contains a thermoplastic styrene elastomer (TPS), an ethylene-α-olefin block copolymer, a thermoplastic polyester elastomer, or a thermoplastic polyamide elastomer, and particularly preferably contains a thermoplastic styrene elastomer (TPS). In the case where the polymer contains a thermoplastic styrene elastomer (TPS), the content of the thermoplastic styrene elastomer (TPS) in the polymer is preferably 10 mass % or more and less than 100 mass %, particularly preferably to 70 mass %. Further, in the case where the polymer contains an ethylene-α-olefin block copolymer, the content of the ethylene-α-olefin block copolymer in the polymer is preferably 10 mass % or more and less than 100 mass %, particularly preferably 20 to 70 mass %. Further, in the case where the polymer contains a thermoplastic polyester elastomer, the content of the thermoplastic polyester elastomer in the polymer is preferably 10 mass % or more and less than 100 mass %, particularly preferably 20 to 70 mass %. Further, in the case where the polymer contains a thermoplastic polyamide elastomer, the content of the thermoplastic polyamide elastomer in the polymer is preferably 10 mass % or more and less than 100 mass %, particularly preferably 20 to 70 mass %.

Ethylene-butene copolymer (EBM) and ethylene-vinyl acetate copolymer (EVA) have a comparatively low melting point. Therefore, the polymer composition preferably contains an ethylene-butene copolymer (EBM) or an ethylene-vinyl acetate copolymer (EVA), since it is easy to apply a design by heating the crosslinked foam. It is more preferable that the polymer in the polymer composition contain 20 to 40 mass % of the ethylene-butene copolymer (EBM). Further, it is more preferable that the polymer in the polymer composition contain 20 to 40 mass % of the ethylene-vinyl acetate copolymer (EVA).

The technique for crosslinking and foaming the polymer is not specifically limited, and crosslinking agents and foaming agents that are used for forming general crosslinked foams can be used also in this embodiment. As the crosslinking agents, organic peroxides, maleimide crosslinking agents, sulfur, phenolic crosslinking agents, oximes, and polyamines, for example, can be employed. Among these, organic peroxides are preferable. Further, it is also possible to form a crosslinked structure using electron beams. In the case of performing electron beam crosslinking, it is also possible to use electron beam crosslinking agents.

As the organic peroxides, one or two or more selected from dicumyl peroxide, di-t-butyl peroxide, 2,5-dimethyl-2,5-di-(t-butylperoxy)hexane, 2,5-dimethyl-2,5-di-(t-butylperoxy)hexyne-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butyl perbenzoate, t-butylperoxy-isopropyl carbonate, diacetyl peroxide, lauroyl peroxide, and t-butyl cumyl peroxide, for example, can be employed.

The organic peroxides are preferably used for forming the crosslinked foam at a ratio of 0.01 part by mass or more and 10 parts by mass or less with respect to 100 parts by mass of the total of polymers contained in the polymer composition of this embodiment.

Further, the crosslinked foam can use crosslinking aids in combination with the crosslinking agents to adjust the crosslink density. As the crosslinking aids, one or two or more selected from divinyl benzene, trimethylolpropanetrimethacrylate, 1,6-hexanediol methacrylate, 1,9-nonanediol dimethacrylate, 1,10-decanediol dimethacrylate, trimellitic acid triallyl ester, triallyl isocyanate, neopentyl glycol dimethacrylate, 1,2,4-benzenetricarboxylic acid triallyl ester, tricyclodecane dimethacrylate, and polyethylene glycol diacrylate, for example, can be employed.

Further, the crosslinked foam may be configured by blending inorganic particles having a high surface energy, such as clay, talc, silica, and carbon black with the polymer composition, so that the inorganic particles form pseudo crosslinking points in the polymer composition.

The technique for foaming the polymer is not specifically limited, and foams can be formed by a chemical foaming method using an organic or inorganic chemical foaming agent, or a physical foaming method using a physical foaming agent. As the foaming agent, one or two or more selected from thermally decomposable organic foaming agents such as azo compounds, e.g., azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis (2,4,4-trimethylpentane), 1,1'-azobis (cyclohexane-1-carbonitrile), and 2,2'-azobis[N-(2-carboxyethyl)-2-methyl-propionamidine]; nitroso compounds, e.g., N,N'-dinitrosopentamethylenetetramine (DPT); hydrazine derivatives such as 4,4'-oxybis (benzenesulfonyl hydrazide) and diphenylsulfone-3,3'-disulfonyl hydrazide; semicarbazide compounds, e.g., p-toluenesulfonyl semicarbazide; and trihydrazino triazine, for example, can be employed.

Further, as the foaming agent, one or two or more selected from thermally decomposable inorganic foaming agents such as bicarbonates, e.g., sodium hydrogen carbonate and ammonium hydrogen carbonate, and carbonates, e.g., sodium carbonate and ammonium carbonate; nitrites such as ammonium nitrite, and hydrogen compounds can be employed.

Further, organic foaming agents such as various aliphatic hydrocarbons, e.g., methanol, ethanol, propane, butane, pentane, and hexane, and inorganic foaming agents such as air, carbon dioxide, nitrogen, argon, and water also can be used as the foaming agent for forming the crosslinked foam.

Examples of other additives to be contained in the crosslinked foam include a dispersant, a processing aid, a weathering agent, a flame retardant, a pigment, a mold release agent, an antistatic agent, an antibacterial agent, and a deodorizer.

The method for forming such a crosslinked foam is not specifically limited, and conventionally known methods can be employed.

The shoe according to this embodiment includes the shoe sole members according to this embodiment.

The shoe sole member and the shoe according to the present invention are not limited to the aforementioned embodiments. Further, the shoe sole member and the shoe according to the present invention are not limited also to those having the aforementioned operational effects. Various modifications can be made to the shoe sole member and the shoe according to the present invention without departing from the gist of the present invention. For example, the shoe sole member of the present invention may be formed using only the aforementioned crosslinked foam, or may be formed using other materials such as fabrics and resin sheets in combination without impairing the effects of the present invention.

Example 1

Next, the present invention will be described further in detail by way of examples. However, the present invention is not limited to these examples.

(Preliminary Examination 1)

A thermoplastic styrene elastomer having a hard segment and a soft segment (hereinafter, referred to also as "TPS-A"), three kinds of olefin elastomers (hereinafter, referred to also as "TPO-A", "TPO-B", and "TPO-C"), and an ethylene-vinyl acetate copolymer (hereinafter, referred to also as "EVA-A") were prepared, and the spin-spin relaxation time ($T_{2S}$, $T_{2M}$, and $T_{2L}$) at 25° C. and the content ratio ($F_S$, $F_M$, and $F_L$) of each phase (S phase, M phase, and L phase) were measured in an uncrosslinked state using pulsed NMR. Further, also for crosslinked foams produced using these polymers, the spin-spin relaxation time and the content ratio of each phase were measured by pulsed NMR. Table 1 below shows the results.

TABLE 1

| No. | Polymer type | Measurement state | $T_{2L}$ [ms] | $T_{2M}$ [ms] | $T_{2S}$ [ms] | $F_L$ | $F_M$ | $F_S$ |
|---|---|---|---|---|---|---|---|---|
| 1-1 | TPS-A | Uncrosslinked | 0.190 | 0.056 | 0.016 | 0.37 | 0.54 | 0.09 |
| 1-2 | TPS-A | Crosslinked foam | 0.245 | 0.072 | 0.014 | 0.44 | 0.48 | 0.09 |
| 2-1 | TPO-A | Uncrosslinked | 0.225 | 0.055 | 0.012 | 0.29 | 0.52 | 0.20 |
| 2-2 | TPO-A | Crosslinked foam | 0.220 | 0.053 | 0.012 | 0.29 | 0.53 | 0.18 |
| 3-1 | TPO-B | Uncrosslinked | 0.260 | 0.066 | 0.011 | 0.42 | 0.40 | 0.18 |
| 3-2 | TPO-B | Crosslinked foam | 0.261 | 0.065 | 0.011 | 0.44 | 0.40 | 0.16 |
| 4-1 | TPO-C | Uncrosslinked | 0.295 | 0.070 | 0.011 | 0.66 | 0.23 | 0.11 |
| 4-2 | TPO-C | Crosslinked foam | 0.313 | 0.076 | 0.010 | 0.68 | 0.20 | 0.11 |
| 5-1 | EVA-A | Uncrosslinked | 0.258 | 0.049 | 0.012 | 0.25 | 0.52 | 0.24 |
| 5-2 | EVA-A | Crosslinked foam | 0.273 | 0.052 | 0.011 | 0.27 | 0.51 | 0.22 |

(Preliminary Examination 2)

Crosslinked foams were produced using mixed resins obtained by blending the styrene elastomer (TPS-A) and the first olefin elastomer (TPO-A) of Preliminary Examination 1 at mass ratios ("TPS-A"/"TPO-A") of "80/20", "70/30", and "60/40", respectively. The crosslinked foams were measured by pulsed NMR, and the spin-spin relaxation time ($T_{2S}$, $T_{2M}$, and $T_{2L}$) at 25° C. and the ratio ($F_S$, $F_M$, and $F_L$) of each phase (S phase, M phase, and L phase) were determined. Further, in order to predict the results of the pulsed NMR measurement of the crosslinked foams using the mixed resins, the weighted average based on the data (No. 1-2 and No. 2-2) of the crosslinked foams in Table 1 was determined by calculation. That is, the "$T_{2L}$" value of the crosslinked foam of "80/20" was predicted to be "0.240" by calculating formula "(0.245×80+0.220×20)/100", based on the facts that the "$T_{2L}$" value of "TPS-A" was "0.245", and the "$T_{2L}$" value of "TPO-A" was "0.220", in Table 1.

Further, also for the other crosslinked foams, the weighted average was determined by calculation in the same manner in order to obtain predicted values of the spin-spin relaxation time ($T_{2S}$ and $T_2M$) and the ratio ($F_S$, $F_M$, and $F_L$) of each phase. Table 2 below shows the predicted values from the weighted average and the actually measured values for the crosslinked foams.

TABLE 2

| TPS-A/TPO-A | Measurement state | $T_{2L}$ [ms] | $T_{2M}$ [ms] | $T_{2S}$ [ms] | $F_L$ | $F_M$ | $F_S$ |
|---|---|---|---|---|---|---|---|
| 80/20 | Crosslinked foam | 0.238 | 0.065 | 0.014 | 0.455 | 0.445 | 0.100 |
|  | Predicted value | 0.240 | 0.068 | 0.014 | 0.408 | 0.487 | 0.105 |
| 70/30 | Crosslinked foam | 0.230 | 0.061 | 0.012 | 0.385 | 0.507 | 0.108 |
|  | Predicted value | 0.237 | 0.066 | 0.014 | 0.393 | 0.492 | 0.115 |
| 60/40 | Crosslinked foam | 0.232 | 0.061 | 0.013 | 0.406 | 0.475 | 0.119 |
|  | Predicted value | 0.235 | 0.064 | 0.014 | 0.379 | 0.497 | 0.124 |

Further, a crosslinked foam was produced using a mixed resin obtained by blending a styrene elastomer (hereinafter, referred to also as "TPS-B") having values of the spin-spin relaxation time ($T_{2S}$, $T_{2M}$, and $T_{2L}$) and the ratio ($F_S$, $F_M$, and $F_L$) of each phase in an uncrosslinked state as shown in Table 3 below and the aforementioned olefin elastomer (TPO-A) at a mass ratio ("TPS-B"/"TPO-A") of "80/20". The crosslinked foam was measured by pulsed NMR, and the spin-spin relaxation time ($T_{2S}$, $T_{2M}$, and $T_{2L}$) at 25° C. and the ratio ($F_S$, $F_M$, and $F_L$) of each phase were determined. Further, in order to predict the results of the pulsed NMR measurement for the crosslinked foam, the weighted average based on the data (No. 2-1) of the olefin elastomer (TPO-A) in an uncrosslinked state in Table 1 and the data (No. 6-1) of the styrene elastomer (TPS-B) in an uncrosslinked state shown in Table 3 below was determined by calculation. Table 3 shows the predicted values together with the measured values for the crosslinked foam.

TABLE 3

| No. | Polymer type | Measurement state | $T_{2L}$ [ms] | $T_{2M}$ [ms] | $T_{2S}$ [ms] | $F_L$ | $F_M$ | $F_S$ |
|---|---|---|---|---|---|---|---|---|
| 6-1 | TPS-B | Uncrosslinked | 0.177 | 0.06 | 0.017 | 0.42 | 0.52 | 0.06 |
|  | TPS-B/TPO-A = | Crosslinked foam | 0.196 | 0.060 | 0.013 | 0.382 | 0.527 | 0.091 |
|  | 80/20 | Predicted value | 0.187 | 0.059 | 0.016 | 0.394 | 0.520 | 0.088 |

Also from the results shown in Tables above, it is understood that, when a crosslinked foam is created using a polymer or the like, predicting the values of the spin-spin relaxation time and the content ratio of each phase of the crosslinked foam is facilitated by pulsed NMR measurement of the spin-spin relaxation time and the ratio of each phase for the polymer or the like before crosslinking. That is, from the results shown in Tables above, it is understood that it is easy to predict whether or not the crosslinked foam satisfies the following inequalities in advance.

$$F_S/T_{2S} \geq 10 \quad (1)$$

$$0.10 \leq F_M \cdot T_{2M} + F_L \cdot T_{2L} \leq 0.30 \quad (2)$$

Examples and Comparative Examples

As polymers, ethylene-butene copolymer (EBM(1) and EBM(2)), ethylene-vinyl acetate copolymer (EVA(1) and EVA(2)), isoprene rubber, linear low density polyethylene (LLDPE), high density polyethylene (HDPE), thermoplastic styrene elastomer (TPS(1), TPS(3), and TPS(5)), ethylene-α-olefin block copolymer (OBC(1), OBC(2), and OBC(3)), thermoplastic polyester elastomer (TPEE(1) and TPEE(2)), and thermoplastic polyamide elastomer (TPAE(1)) were prepared. Further, as other components, stearic acid, zinc oxide, a chemical foaming agent, a crosslinking agent, and a crosslinking aid were prepared. Then, crosslinked foams were produced by the formulations as shown in Tables 4 and 5 below.

Figure 2:
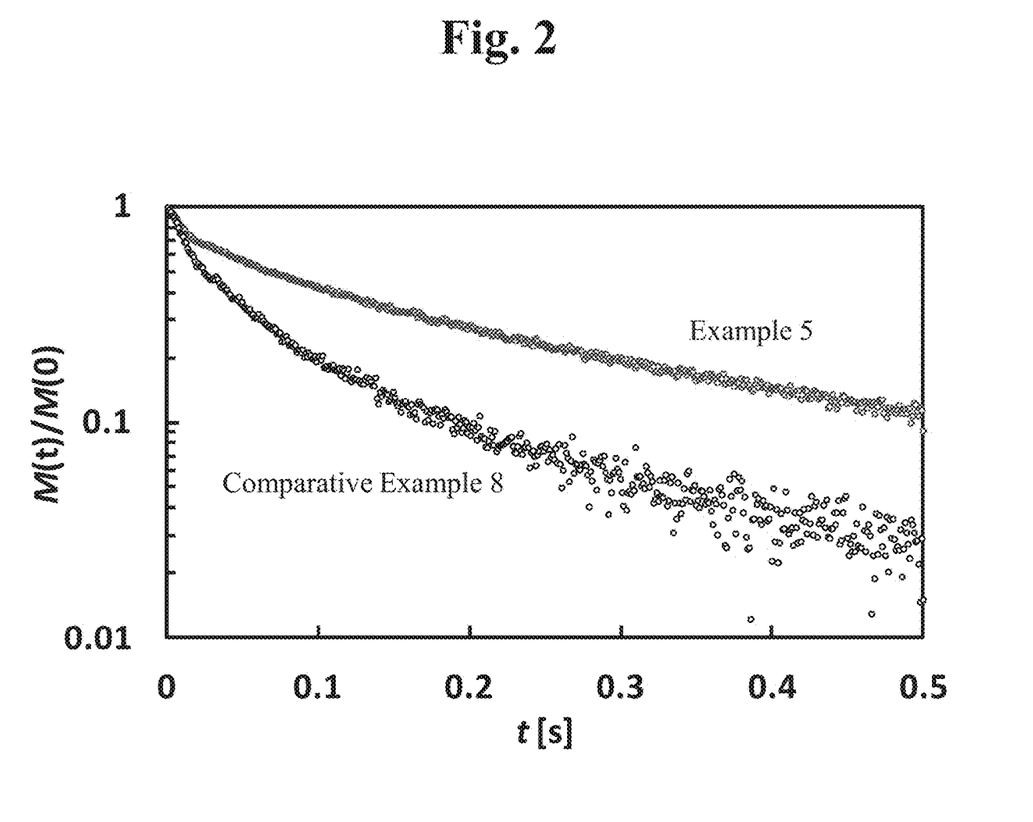
FIG. 2 is a graph showing the results of pulsed NMR measurement for crosslinked foams of Example 5 and Comparative Example 8.
Figure 3:
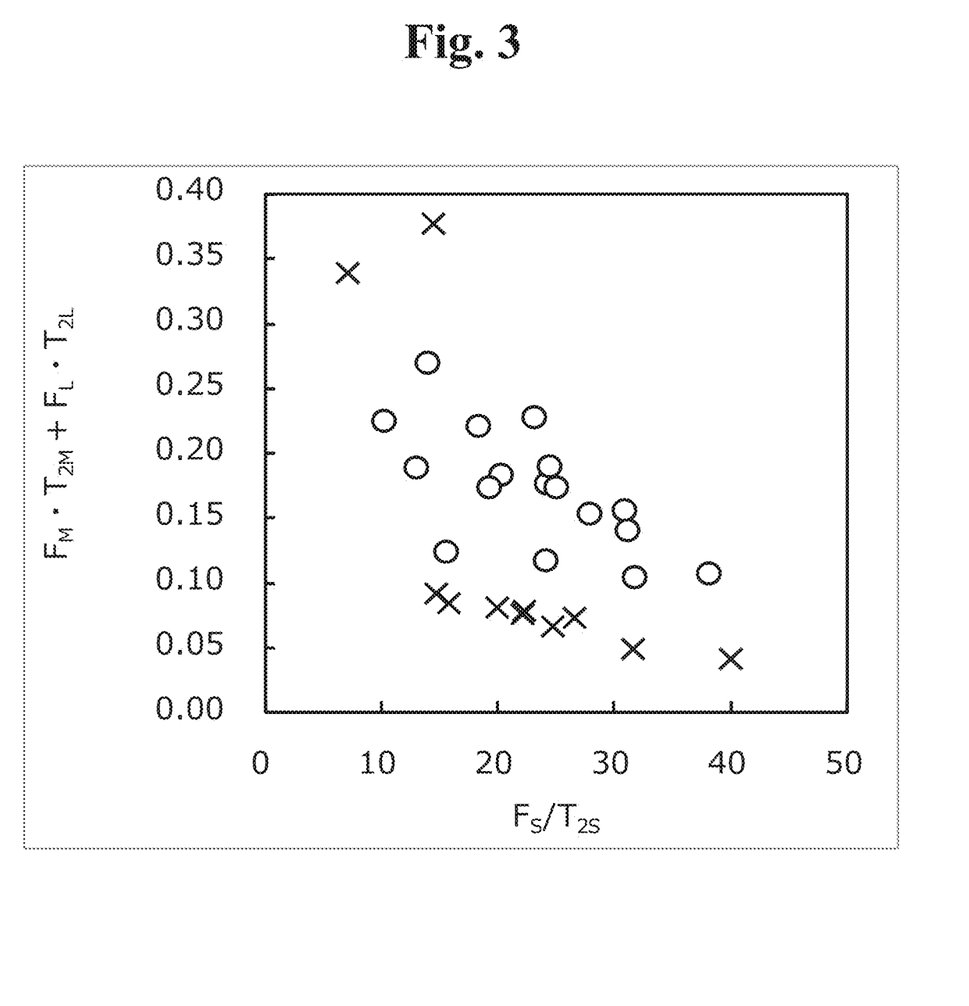
FIG. 3 is a graph showing $F_S/T_{2S}$ and $F_M \cdot T_{2M} + F_L \cdot T_{2L}$ of Examples (o) and Comparative Examples (x).

Tables 4 and 5 show the measurement results of the rebound resilience, the hardness, the specific gravity, and the complex elastic modulus for the crosslinked foams. Further, Tables 4 and 5 also show the results of pulsed NMR measurement (23° C.) for the crosslinked foams. The results of pulsed NMR measurement do not change within the room temperature region, and therefore the measurement results, for example, at 25° C. would be the same. FIG. 2 shows the results of pulsed NMR measurement for the crosslinked foams of Example 5 and Comparative Example 8. Further, FIG. 3 shows $F_S/T_{2S}$ and $F_M \cdot T_{2M} + F_L \cdot T_{2L}$ of Examples (o) and Comparative Examples (x).

The evaluation was performed according to the following criteria. That is, for the rebound resilience, a rebound resilience of 51% or more was evaluated as "o". Further, for the stiffness and the lightweight properties, a hardness/specific gravity of 200 or more was evaluated as "o". Further, for the heat resistance, the crosslinked foam with E*(80° C.)/E*(23° C.) of 0.1 or more was evaluated as "o". Further, the crosslinked foam with E*(−40° C.)/E*(23° C.) of 15 or less was evaluated as "o".

TABLE 4

|  |  | Ex. 1 | Ex. 2 | Ex. 3 | Ex. 4 | Ex. 5 | Ex. 6 |
|---|---|---|---|---|---|---|---|
| Formulation of polymer composition (part(s) by mass) | EBM(1) |  |  |  |  |  |  |
|  | EBM(2) | 70 | 35 | 30 | 30 | 30 |  |
|  | EVA(1) |  |  |  | 20 |  |  |
|  | EVA(2) |  |  |  |  | 10 |  |
|  | Isoprene rubber |  |  |  |  |  |  |
|  | LLDPE |  | 35 |  | 5 |  |  |
|  | HDPE |  |  | 10 | 15 |  |  |
|  | TPS(1) |  |  | 60 |  |  |  |
|  | TPS(3) |  |  |  |  |  |  |
|  | TPS(5) |  |  |  |  |  |  |
|  | OBC(1) | 30 | 30 |  | 30 | 60 | 100 |
|  | OBC(2) |  |  |  |  |  |  |
|  | OBC(3) |  |  |  |  |  |  |
|  | TPEE(1) |  |  |  |  |  |  |
|  | TPEE(2) |  |  |  |  |  |  |
|  | TPAE(1) |  |  |  |  |  |  |
|  | Stearic acid | 1 | 1 | 1 | 1 | 1 | 1 |
|  | Zinc oxide | 2 | 2 | 2 | 2 | 2 | 2 |
|  | Chemical foaming agent | 4 | 4 | 4 | 4 | 4 | 4 |
|  | Crosslinking agent | 0.7 | 0.7 | 0.7 | 0.7 | 0.7 | 0.7 |
|  | Crosslinking aid | 0.3 | 0.3 | 0.3 | 0.3 | 0.3 | 0.3 |
| NMR measured values | $T_{2L}$ [ms] | 0.266 | 0.265 | 0.396 | 0.280 | 0.349 | 0.374 |
|  | $T_{2M}$ [ms] | 0.060 | 0.056 | 0.074 | 0.054 | 0.069 | 0.076 |
|  | $T_{2S}$ [ms] | 0.011 | 0.0091 | 0.0121 | 0.0087 | 0.0086 | 0.0086 |
|  | $F_L$ [—] | 0.363 | 0.313 | 0.649 | 0.291 | 0.453 | 0.528 |
|  | $F_M$ [—] | 0.465 | 0.465 | 0.182 | 0.433 | 0.372 | 0.314 |
|  | $F_S$ [—] | 0.173 | 0.222 | 0.170 | 0.276 | 0.175 | 0.158 |
| NMR parameters | $F_S/T_{2S}$ [1/ms] | 15.607 | 24.159 | 14.006 | 31.795 | 20.321 | 18.370 |
|  | $F_L \cdot T_{2L}$ [ms] | 0.096 | 0.093 | 0.257 | 0.081 | 0.158 | 0.197 |
|  | $F_M + F_L$ [—] | 0.827 | 0.778 | 0.830 | 0.724 | 0.825 | 0.842 |
|  | $F_M \cdot T_{2M} + F_L \cdot T_{2L}$ [ms] | 0.124 | 0.118 | 0.270 | 0.105 | 0.184 | 0.221 |
| Properties of crosslinked foam | Rebound resilience [%] | 64 | 55 | 70 | 52 | 58 | 66 |
|  | Hardness [—] | 40 | 39 | 45 | 45 | 50 | 40 |
|  | Specific gravity [—] | 0.13 | 0.12 | 0.14 | 0.1 | 0.19 | 0.133 |
|  | Specific stiffness (Hardness/Specific gravity) [—] | 308 | 325 | 321 | 450 | 263 | 301 |
| Complex elastic modulus of crosslinked foam | E*(23° C.) [MPa] | 1.73 | 6.26 | 1.79 | 4.50 | 3.67 | 1.78 |
|  | E*(80° C.)/E*(23° C.) [—] | 0.18 | 0.14 | 0.39 | 0.14 | 0.17 | 0.23 |
|  | E*(−40° C.)/E*(23° C.) [—] | 10.54 | 5.85 | 6.31 | 5.98 | 9.44 | 8.40 |
| Evaluation | Rebound resilience | ○ | ○ | ○ | ○ | ○ | ○ |
|  | Stiffness and lightweight properties | ○ | ○ | ○ | ○ | ○ | ○ |
|  | Heat resistance | ○ | ○ | ○ | ○ | ○ | ○ |
|  | Difficulty of curing at low temperature | ○ | ○ | ○ | ○ | ○ | ○ |

|  |  | Ex. 7 | Ex. 8 | Ex. 9 | Ex. 10 | Ex. 11 | Ex. 12 |
|---|---|---|---|---|---|---|---|
| Formulation of polymer composition (part(s) by mass) | EBM(1) |  |  | 50 |  |  |  |
|  | EBM(2) |  |  |  | 50 | 50 | 30 |
|  | EVA(1) |  |  |  |  |  | 10 |
|  | EVA(2) |  |  |  |  |  |  |
|  | Isoprene rubber |  |  |  |  |  |  |
|  | LLDPE |  | 50 |  |  |  |  |
|  | HDPE |  |  |  |  |  | 30 |
|  | TPS(1) |  | 50 | 50 | 50 |  |  |
|  | TPS(3) |  |  |  |  | 50 |  |
|  | TPS(5) |  |  |  |  |  |  |
|  | OBC(1) |  |  |  |  |  | 30 |
|  | OBC(2) |  |  |  |  |  |  |
|  | OBC(3) | 100 |  |  |  |  |  |
|  | TPEE(1) |  |  |  |  |  |  |
|  | TPEE(2) |  |  |  |  |  |  |
|  | TPAE(1) |  |  |  |  |  |  |
|  | Stearic acid | 1 | 1 | 1 | 1 | 1 | 1 |
|  | Zinc oxide | 2 | 2 | 2 | 2 | 2 | 2 |
|  | Chemical foaming agent | 4 | 4 | 4 | 4 | 4 | 4 |
|  | Crosslinking agent | 0.7 | 0.7 | 0.7 | 0.7 | 0.7 | 0.7 |
|  | Crosslinking aid | 0.3 | 0.3 | 0.3 | 0.3 | 0.3 | 0.3 |
| NMR measured values | $T_{2L}$ [ms] | 0.398 | 0.359 | 0.344 | 0.369 | 0.337 | 0.315 |
|  | $T_{2M}$ [ms] | 0.084 | 0.047 | 0.048 | 0.075 | 0.058 | 0.055 |
|  | $T_{2S}$ [ms] | 0.0082 | 0.0091 | 0.0098 | 0.0121 | 0.0108 | 0.0082 |
|  | $F_L$ [—] | 0.510 | 0.450 | 0.455 | 0.542 | 0.500 | 0.268 |
|  | $F_M$ [—] | 0.300 | 0.329 | 0.356 | 0.334 | 0.360 | 0.418 |
|  | $F_S$ [—] | 0.190 | 0.221 | 0.189 | 0.124 | 0.141 | 0.314 |

TABLE 4-continued

|  |  |  |  |  |  |  |  |
|---|---|---|---|---|---|---|---|
| NMR parameters | $F_S/T_{2S}$ [1/ms] | 23.171 | 24.249 | 19.308 | 10.273 | 13.046 | 38.170 |
|  | $F_L \cdot T_{2L}$ [ms] | 0.203 | 0.162 | 0.157 | 0.200 | 0.168 | 0.084 |
|  | $F_M + F_L$ [—] | 0.810 | 0.779 | 0.811 | 0.876 | 0.859 | 0.686 |
|  | $F_M \cdot T_{2M} + F_L \cdot T_{2L}$ [ms] | 0.228 | 0.177 | 0.174 | 0.225 | 0.189 | 0.108 |
| Properties of crosslinked foam | Rebound resilience [%] | 55 | 52 | 55 | 68 | 61 | 55 |
|  | Hardness [—] | 42 | 30 | 33 | 25 | 28 | 45 |
|  | Specific gravity [—] | 0.139 | 0.085 | 0.099 | 0.099 | 0.097 | 0.06 |
|  | Specific stiffness (Hardness/Specific gravity) [—] | 302 | 353 | 333 | 253 | 289 | 750 |
| Complex elastic modulus of crosslinked foam | $E^*(23°\ C.)$ [MPa] | 2.45 | 1.41 | 1.18 | 0.58 | 0.98 | 3.09 |
|  | $E^*(80°\ C.)/E^*(23°\ C.)$ [—] | 0.35 | 0.31 | 0.33 | 0.38 | 0.35 | 0.24 |
|  | $E^*(-40°\ C.)/E^*(23°\ C.)$ [—] | 6.19 | 9.20 | 10.83 | 12.17 | 12.37 | 8.96 |
| Evaluation | Rebound resilience | ○ | ○ | ○ | ○ | ○ | ○ |
|  | Stiffness and lightweight properties | ○ | ○ | ○ | ○ | ○ | ○ |
|  | Heat resistance | ○ | ○ | ○ | ○ | ○ | ○ |
|  | Difficulty of curing at low temperature | ○ | ○ | ○ | ○ | ○ | ○ |

|  |  | Ex. 13 | Ex. 14 | Ex. 15 | Ex. 16 | Ex. 17 |
|---|---|---|---|---|---|---|
| Formulation of polymer composition (part(s) by mass) | EBM(1) |  |  |  |  |  |
|  | EBM(2) | 30 | 80 |  |  |  |
|  | EVA(1) | 5 |  |  |  |  |
|  | EVA(2) |  |  | 80 | 80 | 80 |
|  | Isoprene rubber |  |  |  |  |  |
|  | LLDPE |  |  |  |  |  |
|  | HDPE | 25 |  |  |  |  |
|  | TPS(1) | 20 |  |  |  |  |
|  | TPS(3) |  |  |  |  |  |
|  | TPS(5) |  |  |  |  |  |
|  | OBC(1) | 20 |  |  |  |  |
|  | OBC(2) |  |  |  |  |  |
|  | OBC(3) |  |  |  |  |  |
|  | TPEE(1) |  | 20 | 20 |  |  |
|  | TPEE(2) |  |  |  | 20 |  |
|  | TPAE(1) |  |  |  |  | 20 |
|  | Stearic acid | 1 | 1 | 1 | 1 | 1 |
|  | Zinc oxide | 2 | 2 | 2 | 2 | 2 |
|  | Chemical foaming agent | 4 | 4 | 4 | 4 | 4 |
|  | Crosslinking agent | 0.7 | 0.7 | 0.7 | 0.7 | 0.7 |
|  | Crosslinking aid | 0.3 | 0.3 | 0.3 | 0.3 | 0.3 |
| NMR measured values | $T_{2L}$ [ms] | 0.339 | 0.304 | 0.309 | 0.297 | 0.392 |
|  | $T_{2M}$ [ms] | 0.061 | 0.061 | 0.056 | 0.057 | 0.062 |
|  | $T_{2S}$ [ms] | 0.0094 | 0.01288 | 0.0115 | 0.01199 | 0.01172 |
|  | $F_L$ [—] | 0.382 | 0.317 | 0.337 | 0.344 | 0.343 |
|  | $F_M$ [—] | 0.347 | 0.512 | 0.484 | 0.485 | 0.490 |
|  | $F_S$ [—] | 0.271 | 0.171 | 0.179 | 0.171 | 0.168 |
| NMR parameters | $F_S/T_{2S}$ [1/ms] | 30.921 | 31.183 | 27.925 | 25.058 | 24.492 |
|  | $F_L \cdot T_{2L}$ [ms] | 0.136 | 0.120 | 0.131 | 0.151 | 0.167 |
|  | $F_M + F_L$ [—] | 0.729 | 0.728 | 0.757 | 0.782 | 0.791 |
|  | $F_M \cdot T_{2M} + F_L \cdot T_{2L}$ [ms] | 0.156 | 0.141 | 0.154 | 0.174 | 0.190 |
| Properties of crosslinked foam | Rebound resilience [%] | 60 | 62 | 55 | 56 | 53 |
|  | Hardness [—] | 45 | 27 | 27 | 54 | 38 |
|  | Specific gravity [—] | 0.12 | 0.111 | 0.11 | 0.161 | 0.18 |
|  | Specific stiffness (Hardness/Specific gravity) [—] | 375 | 243 | 245 | 335 | 211 |
| Complex elastic modulus of crosslinked foam | $E^*(23°\ C.)$ [MPa] | 2.70 | 0.78 | 0.80 | 2.68 | 1.63 |
|  | $E^*(80°\ C.)/E^*(23°\ C.)$ [—] | 0.27 | 0.25 | 0.25 | 0.23 | 0.16 |
|  | $E^*(40°\ C.)/E^*(23°\ C.)$ [—] | 8.44 | 15.26 | 23.84 | 20.11 | 44.42 |
| Evaluation | Rebound resilience | ○ | ○ | ○ | ○ | ○ |
|  | Stiffness and lightweight properties | ○ | ○ | ○ | ○ | ○ |
|  | Heat resistance | ○ | ○ | ○ | ○ | ○ |
|  | Difficulty of curing at low temperature | ○ | x | x | x | x |

TABLE 5

|  |  | C. Ex. 1 | C. Ex. 2 | C. Ex. 3 | C. Ex. 4 | C. Ex. 5 |
|---|---|---|---|---|---|---|
| Formulation of polymer composition (part(s) by mass) | EBM(1) | 100 | | | | |
| | EBM(2) | | 100 | | | |
| | EVA(1) | | | | | |
| | EVA(2) | | | 100 | | |
| | Isoprene rubber | | | | | |
| | LLDPE | | | | 100 | |
| | HDPE | | | | | |
| | TPS(1) | | | | | 100 |
| | TPS(3) | | | | | |
| | TPS(5) | | | | | |
| | OBC(1) | | | | | |
| | OBC(2) | | | | | |
| | OBC(3) | | | | | |
| | TPEE(1) | | | | | |
| | TPEE(2) | | | | | |
| | TPAE(1) | | | | | |
| | Stearic acid | 1 | 1 | 1 | 1 | 1 |
| | Zinc oxide | 2 | 2 | 2 | 2 | 2 |
| | Chemical foaming agent | 4 | 4 | 4 | 4 | 4 |
| | Crosslinking agent | 0.7 | 0.7 | 0.7 | 0.7 | 1 |
| | Crosslinking aid | 0.3 | 0.3 | | 0.3 | 0.3 |
| NMR measured values | $T_{2L}$ [ms] | 0.206 | 0.220 | 0.221 | 0.193 | 0.422 |
| | $T_{2M}$ [ms] | 0.041 | 0.053 | 0.048 | 0.038 | 0.124 |
| | $T_{2S}$ [ms] | 0.0091 | 0.0121 | 0.0108 | 0.0087 | 0.0127 |
| | $F_L$ [—] | 0.121 | 0.292 | 0.259 | 0.106 | 0.762 |
| | $F_M$ [—] | 0.591 | 0.529 | 0.570 | 0.546 | 0.147 |
| | $F_S$ [—] | 0.288 | 0.179 | 0.171 | 0.349 | 0.091 |
| NMR parameters | $F_S/T_{2S}$ [1/ms] | 31.663 | 14.768 | 15.858 | 40.059 | 7.167 |
| | $F_L \cdot T_{2L}$ [ms] | 0.025 | 0.064 | 0.057 | 0.020 | 0.321 |
| | $F_M + F_L$ [—] | 0.712 | 0.821 | 0.829 | 0.651 | 0.909 |
| | $F_M \cdot T_{2M} + F_L \cdot T_{2L}$ [ms] | 0.049 | 0.092 | 0.084 | 0.041 | 0.339 |
| Properties of crosslinked foam | Rebound resilience [%] | 43 | 63 | 50 | 37 | 68 |
| | Hardness [—] | 41 | 32 | 45 | 48 | 16 |
| | Specific gravity [—] | 0.088 | 0.099 | 0.16 | 0.085 | 0.101 |
| | Specific stiffness (Hardness/Specific gravity) [—] | 466 | 323 | 281 | 565 | 158 |
| Complex elastic modulus of crosslinked foam | $E^*(23°\text{C.})$ [MPa] | 4.29 | 1.19 | 5.61 | 9.26 | 0.67 |
| | $E^*(80°\text{C.})/E^*(23°\text{C.})$ [—] | 0.17 | 0.04 | 0.09 | 0.14 | 0.45 |
| | $E^*(-40°\text{C.})/E^*(23°\text{C.})$ [—] | 9.07 | 15.46 | 18.08 | 4.73 | 3.52 |
| Evaluation | Rebound resilience | x | ○ | x | x | ○ |
| | Stiffness and lightweight properties | ○ | ○ | ○ | ○ | x |
| | Heat resistance | ○ | x | x | ○ | ○ |
| | Difficulty of curing at low temperature | ○ | x | x | ○ | ○ |

|  |  | C. Ex. 6 | C. Ex. 7 | C. Ex. 8 | C. Ex. 9 | C. Ex. 10 | C. Ex. 11 |
|---|---|---|---|---|---|---|---|
| Formulation of polymer composition (part(s) by mass) | EBM(1) | 20 | | | | | 50 |
| | EBM(2) | 40 | 20 | 20 | | 50 | 50 |
| | EVA(1) | 40 | 80 | 40 | | | |
| | EVA(2) | | | | 40 | | |
| | Isoprene rubber | | | | 60 | | |
| | LLDPE | | | | 20 | | |
| | HDPE | | | | | 50 | |
| | TPS(1) | | | | | | |
| | TPS(3) | | | | | | |
| | TPS(5) | | | | 20 | | |
| | OBC(1) | | | | | | |
| | OBC(2) | | | | | | |
| | OBC(3) | | | | | | |
| | TPEE(1) | | | | | | |
| | TPEE(2) | | | | | | |
| | TPAE(1) | | | | | | |
| | Stearic acid | 1 | 1 | 1 | 1 | 1 | 1 |
| | Zinc oxide | 2 | 2 | 2 | 2 | 2 | 2 |
| | Chemical foaming agent | 4 | 4 | 4 | 4 | 4 | 4 |
| | Crosslinking agent | 0.7 | 0.7 | 0.7 | 0.3 | 0.7 | 0.7 |
| | Crosslinking aid | 0.2 | 0.1 | | 0.1 | 0.3 | 0.3 |
| NMR measured values | $T_{2L}$ [ms] | 0.225 | 0.206 | 0.235 | 0.724 | 0.218 | 0.224 |
| | $T_{2M}$ [ms] | 0.049 | 0.042 | 0.049 | 0.063 | 0.047 | 0.049 |
| | $T_{2S}$ [ms] | 0.0104 | 0.0097 | 0.0104 | 0.0120 | 0.0094 | 0.0101 |
| | $F_L$ [—] | 0.217 | 0.211 | 0.226 | 0.492 | 0.220 | 0.231 |
| | $F_M$ [—] | 0.553 | 0.549 | 0.566 | 0.333 | 0.530 | 0.544 |
| | $F_S$ [—] | 0.230 | 0.240 | 0.208 | 0.174 | 0.250 | 0.225 |

TABLE 5-continued

| | | | | | | | |
|---|---|---|---|---|---|---|---|
| NMR parameters | $F_S/T_{2S}$ [1/ms] | 22.180 | 24.779 | 20.006 | 14.532 | 26.640 | 22.316 |
| | $F_L \cdot T_{2L}$ [ms] | 0.049 | 0.043 | 0.053 | 0.357 | 0.048 | 0.052 |
| | $F_M + F_L$ [—] | 0.770 | 0.760 | 0.792 | 0.826 | 0.750 | 0.775 |
| | $F_M \cdot T_{2M} + F_L \cdot T_{2L}$ [ms] | 0.076 | 0.067 | 0.081 | 0.377 | 0.073 | 0.079 |
| Properties of crosslinked foam | Rebound resilience [%] | 45 | 45 | 52 | 55 | 45 | 48 |
| | Hardness [—] | 45 | 45 | 45 | 45 | 36 | 30 |
| | Specific gravity [—] | 0.14 | 0.14 | 0.14 | 0.23 | 0.087 | 0.092 |
| | Specific stiffness (Hardness/Specific gravity) [—] | 321 | 321 | 321 | 196 | 414 | 326 |
| Complex elastic modulus of crosslinked foam | $E^*(23°\,C.)$ [MPa] | 2.64 | 4.30 | 2.41 | 1.74 | 1.41 | 1.46 |
| | $E^*(80°\,C.)/E^*(23°\,C.)$ [—] | 0.14 | 0.09 | 0.06 | 0.11 | 0.21 | 0.23 |
| | $E^*(-40°\,C.)/E^*(23°\,C.)$ [—] | 17.92 | 16.59 | 27.78 | 11.32 | 13.01 | 15.62 |
| Evaluation | Rebound resilience | x | x | ○ | ○ | x | x |
| | Stiffness and lightweight properties | ○ | ○ | ○ | x | ○ | ○ |
| | Heat resistance | ○ | x | x | ○ | ○ | ○ |
| | Difficulty of curing at low temperature | x | x | x | ○ | ○ | x |

As seen from Tables 4 and 5, the present invention can provide a crosslinked foam that can have low specific gravity, excellent heat resistance, and mechanical properties suitable for shoe sole members, thereby providing a shoe sole member suitable for forming a comfortable shoe, and a comfortable shoe.

REFERENCE SIGNS LIST

1: Shoe
3: Midsole
4: Outer sole

The invention claimed is:

1. A shoe sole member partially or entirely formed by a crosslinked foam,
the crosslinked foam is formed by crosslinking and foaming a polymer composition, wherein the polymer composition includes a plurality of polymers suitable for forming shoe sole members and including an ethylene-α-olefin block copolymer that is 20% or more of the mass of the plurality of polymers, wherein the polymer composition does not include a styrene-based elastomer, wherein the polymer composition includes no ethylene-vinyl acetate copolymer or a content of the ethylene-vinyl acetate copolymer is 20% or less of the mass of the plurality of polymers if the polymer composition includes the ethylene-vinyl acetate copolymer, and wherein the crosslinked foam satisfies formulas (1) and (2) below that are determined by measuring a spin-spin relaxation time at 23° C. by pulsed NMR and formula (3) below that is determined in dynamic viscoelasticity measurement by measuring a complex elastic modulus under conditions of a frequency of 1 Hz, a distortion of 0.025%, a rate of temperature increase of 2° C./min:

$$FS/T2S \geq 10 \tag{1}$$

$$0.10 \leq FM \cdot T2M + FL \cdot T2L \leq 0.30 \tag{2},$$

where "FS" in formula (1) above represents a content ratio of S phase having a spin-spin relaxation time of less than 0.02 ms in the crosslinked foam, and "T2S" represents the spin-spin relaxation time of S phase,
"FM" in formula (2) above represents a content ratio of M phase having a spin-spin relaxation time of 0.02 ms or more and less than 0.1 ms in the crosslinked foam, and "T2M" represents the spin-spin relaxation time of M phase,
"FL" in formula (2) above represents a content ratio of L phase having a spin-spin relaxation time of 0.1 ms or more in the crosslinked foam, and "T2L" represents the spin-spin relaxation time of L phase,
unit of FS/T2S is "1/ms", and
unit of FM·T2M+FL·T2L is "ms"; and $$E^*(80°\,C.)/E^*(23°\,C.) \geq 0.1 \tag{3},$$

where "$E^*(80°\,C.)$" in formula (3) above represents a complex elastic modulus at 80° C., and
"$E^*(23°\,C.)$" in formula (3) above represents a complex elastic modulus at 23° C.

2. The shoe sole member according to claim 1, wherein a content ratio of the ethylene-α-olefin block copolymer is 20 to 70 mass % of the mass of the plurality of polymers.

3. The shoe sole member according to claim 1, wherein the plurality of polymers contain a thermoplastic polyester elastomer, and
a content ratio of the thermoplastic polyester elastomer is 20 to 70 mass % of the mass of the plurality of polymers.

4. The shoe sole member according to claim 1, wherein the plurality of polymers contain a thermoplastic polyamide elastomer, and
a content ratio of the thermoplastic polyamide elastomer is 20 to 70 mass % of the mass of the plurality of polymers.

5. A shoe comprising the shoe sole member according to claim 1.

6. A shoe comprising the shoe sole member according to claim 2.

7. A shoe comprising the shoe sole member according to claim 3.

8. A shoe comprising the shoe sole member according to claim 4.

9. The shoe sole member according to claim 1, wherein the polymer composition includes no ethylene-vinyl acetate copolymer.

* * * * *